Sept. 19, 1961  R. A. GRAY, JR., ET AL  3,000,345
LIQUID INDICATOR
Filed Feb. 19, 1960  2 Sheets-Sheet 1
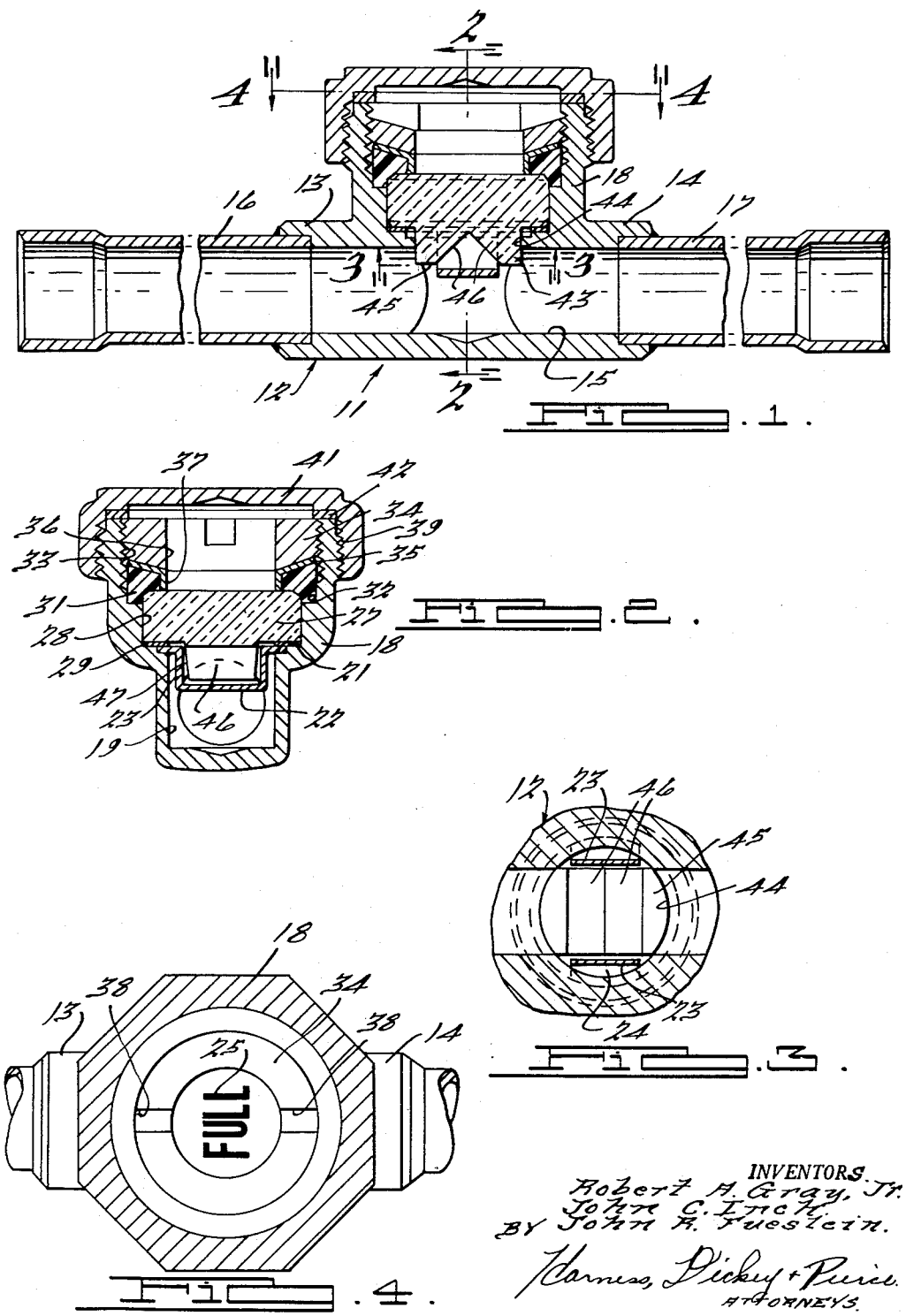

Sept. 19, 1961 R. A. GRAY, JR., ET AL 3,000,345
LIQUID INDICATOR
Filed Feb. 19, 1960 2 Sheets-Sheet 2

INVENTORS.
Robert A. Gray, Jr.
John C. Inch,
BY John R. Fuestein

Barnes, Dickey & Pierce
ATTORNEYS.

United States Patent Office 3,000,345
Patented Sept. 19, 1961

3,000,345
LIQUID INDICATOR
Robert A. Gray, Jr., Port Huron, John C. Inch, Marysville, and John R. Fueslein, Jeddo, Mich., assignors to Mueller Brass Co., Port Huron, Mich., a corporation of Michigan
Filed Feb. 19, 1960, Ser. No. 9,834
9 Claims. (Cl. 116—117)

This invention relates to liquid indicators, and more particularly to means for indicating the presence or absence of a full condition in a liquid conduit, such as a portion of a refrigerating circuit, as well as the presence of moisture in a refrigerant charge.

It is an object of the invention to provide an improved liquid indicator of this type which will provide a constant and instantaneous visual indication of whether a liquid line is full or partially empty, this indication being given in a foolproof and accurate manner.

It is another object to provide an improved liquid indicator of this type which is of extremely simple and inexpensive construction, has no moving parts which could get out of order, and may be conveniently installed in a refrigerating circuit.

It is another object to provide an improved liquid indicator having the above characteristics, which may be combined with a moisture indicator of a known type, so that the indicator could be used both to indicate lack of a full circuit and to denote the presence of moisture in the refrigerant line.

The foregoing and other objects and advantages of the present invention will become apparent in the following detailed description of a preferred embodiment thereof, taken in conjunction with the drawing wherein:

FIGURE 1 is a cross-sectional view in elevation of a preferred embodiment of the invention, taken along the centerline of FIGURE 2 and showing the configuration of the prismatic sight glass;

FIGURE 2 is a cross-sectional view taken along the line 2—2 of FIGURE 1 and showing the means for retaining the indicator clip in position;

FIGURE 3 is a cross-sectional plan view taken along the line 3—3 of FIGURE 1 and showing further details of the sight glass construction;

FIGURE 4 is an enlarged cross-sectional plan view taken along the line 4—4 of FIGURE 1 and showing the word "FULL" appearing on the indicator clip through the sight glass;

Figure 6:
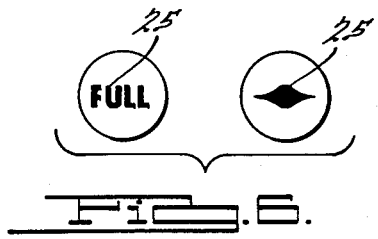
Figure 7:
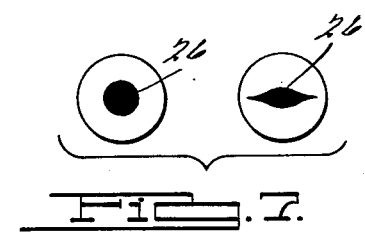

FIGURE 6 is a schematic view showing the difference between the image of the indicator clip through the sight glass when the line is full, and the image when the line is not completely full; and FIGURE 7 is a schematic view similar to that of FIGURE 6, showing the image of a "dot" type of moisture indicator which could be mounted on the indicator clip as a modified form of the invention, this image being shown as it would appear first in a full line, and then in an incompletely full line.

In general terms, the indicator of this invention comprises a body of generally T-shaped construction having line inlet and outlet ports adapted to be connected in a refrigerant or other liquid line. The upwardly extending central portion of the body encloses a sight glass which is secured in sealed relation with the body by a molded packing and a pack gland, a safety seal cap being removably mounted on the open upper end of the central body portion. The sight glass is of generally circular shape and has a downwardly extending portion disposed within the upper portion of the main fluid passage. The downwardly extending portion of the sight glass has a notch formed therein of inverted V-shape, this notch extending across the glass in a direction transverse to the direction of fluid flow in the embodiment illustrated. An indicator clip is secured immediately below this notched portion of the sight glass, the indicator clip carrying the legend "FULL," a disc-like liquid-moisture indicator, or any other appropriate legend or visual indicator.

When the fluid line, including the indicator body passage, is completely filled with liquid, the notched portion of the sight glass will likewise be filled with liquid. The index of refraction of the sight glass relative to that of the liquid is such that light rays transmitted from the legend on the indicator clip will pass through the liquid in the notched portion and through the sight glass in a manner permitting the legend to be clearly read from the outside by an observer after the safety seal cap has been removed. Should the amount of liquid in the line be reduced so that all or a portion of the notch contains refrigerant gas instead of liquid, the light rays passing through the refrigerant gas and then through the sight glass will be refracted in such a way as to be distorted and illegible to an observer, the notched portion of the sight glass thus having a double prism-like effect. Should a chemical indicator in the form of a dot be used instead of the legend "FULL" the shape as well as the color of the indicator dot may be used, a change of color indicating that moisture is present for example in a refrigerant line, and a change of shape from the circular indicating that charging is needed.

Referring more particularly to the drawings, the indicator is generally referred to by the reference numeral 11 and comprises a body generally indicated at 12, the body being of substantially T-shaped construction as shown in FIGURE 1. Body 12 has aligned inlet and outlet ports 13 and 14 connected by a main passage 15, and tube extensions 16 and 17 are shown as being mounted in ports 13 and 14 respectively, to adapt the unit for connection in a line, although it will be understood that other types of connecting means could be provided.

The main portion of body 12, as well as its upwardly extending sight glass portion 18, is relatively thick so as to accommodate the parts as described below. The central portion 19 of passage 15, seen best in FIGURE 2, is widened so as to have a substantially rectangular shape and is provided with upper shoulders 21. An indicator clip 22 is supported by these shoulders, the indicator clip being seen best in FIGURE 5 and comprising a central portion, a pair of upwardly extending legs 23, and a pair of outwardly extending tabs 24 resting on shoulders 21. Clip 22 is adapted to carry a legend 25 such as the word "FULL" imprinted, engraved or otherwise formed thereon. Alternatively, this clip could carry a dot 26 shown in FIGURE 7 of a known chemical substance which changes color in the presence of moisture in a refrigeration system.

A sight glass 27 is disposed above clip 22, this sight glass being of generally circular shape and having a main portion disposed within a bore 28 in body portion 18. The thickness of sight glass 27 is sufficient to withstand line pressures, and the under surface of the main sight glass portion rests on a gasket 29 which engages clip tabs 24 as seen in FIGURE 2. A molded packing 31 is disposed in a bore 32 of body portion 18 above bore 28, this packing engaging the outer portion of the upper sight glass surface. Threads 33 are formed in body portion 18 above bore 32, and a pack gland 34 is carried by threads 33 and is adapted to force packing 31 against sight glass 27, a packing retainer 35 being disposed between gland 34 and packing 31. Both pack gland 34 and retainer 35 have central openings, these being indicated at 36 and 37 respectively, so that the main portion of sight glass 27 will be visible. Notches 38 may also be provided in pack gland 34 so that an appropriate tool may be used to insert or remove the pack gland. An external thread 39 is formed on body portion 18, and a safety seal cap 41 is mountable on these threads as seen in FIGURES 1 and 2 so as to protect the sight glass when not in use. A seal cap washer 42 may be provided between the seal cap and the upper edge of body portion 18. Cap 41 is shown as being of an octagonal shape to facilitate use of a wrench.

Figure 5:
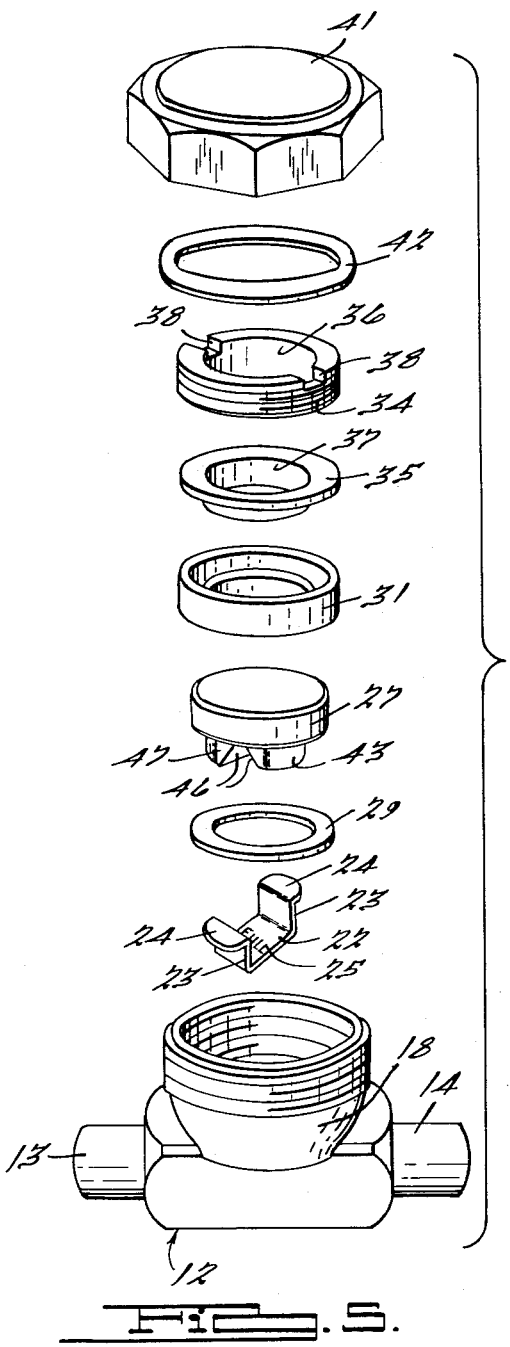
FIGURE 5 is an exploded view showing the various component parts of the liquid indicator.

Sight glass 27 has a downward extension 43 of narrower diameter than that of the main sight glass portion, portion 43 extending through an aperture 44 into the upper portion of main passage 15, as seen in FIGURE 1, with its lower surface 45 terminating immediately above the main portion of indicator clip 22. A notch 46 of inverted V-shape is formed in sight glass extension 43. The shape and size of this notch is such that its lower portion will be approximately the same width as that of indicator clip 22, while its apex is adjacent the main portion of the sight glass, as seen in FIGURE 1. The sides 47 of sight glass portion 43 at opposite ends of notch 46 are of flattened shape, as is best seen in FIGURES 2 and 5, so as to accommodate the upwardly extending portions of indicator clip 22. It will be noted that sufficient space is present between notch 46 and the adjacent portions of clip 22 to permit free fluid flow into and out of the notch space.

In operation, fluid will be carried by main passage 15 of unit 11 as it flows through the refrigerant or other circuit. If the system is fully charged, the liquid will completely fill notch 46. As indicated previously, the index of refraction of the material from which sight glass 27 is fabricated and the index of refraction of the liquid with which the system is charged will be substantially the same, or will be so related that upon removal of safety cap 41, it will be possible for an observer to read clearly the legend 25, namely the word "FULL," and the indicator will appear as schematically shown in the left-hand portion of FIGURE 6.

Should the line not be fully charged, a gas space will be created in notch 46, the size of this space depending upon the degree to which leakage has occurred. Because of the fact that sight glass portion 43 is disposed only in the upper portion of passage 15, only a slight deviation from a fully charged condition will be sufficient to create a gas space in practically the entire space of notch 46. Light rays passing from legend 25 on indicator clip 22 will thus pass through the gas and then through the two oppositely inclined boundary surfaces formed by notch 46. The light rays from legend 25 will thereby be refracted in such a way as to appear as seen in the right-hand portion of FIGURE 6. It will thus be immediately apparent that the system is not fully charged.

Should the dot moisture indicator 26 be used instead of legend 25, this dot will appear as shown in the left-hand portion of FIGURE 7 when the system is fully charged for the same reasons as described above with respect to legend 25. The color of dot 26 may then indicate whether or not moisture is present in the system. Upon reduction of the system charge, dot 26 will appear as shown in the right-hand portion of FIGURE 7 because of refraction of the light rays passing through the gas in notch 46 and then through sight glass 27. This indicator may thus be used both to show whether the system is fully charged and to indicate any moisture.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a liquid indicator, a liquid passage, a sight glass connected with said passage, an inclined portion on said sight glass adapted to be contacted by liquid in said passage only when the passage is full, and a visual indicator mounted adjacent said inclined sight glass surface whereby said indicator will appear distorted when the liquid is not in contact with said surface.

2. In a liquid indicator, an elongated body having a liquid passage, a sight glass in the upper portion of said body, the lower portion of said sight glass being disposed in the upper portion of said passage, relatively inclined upper and lower surfaces on said sight glass, the lower sight glass surface being adapted to be contacted by liquid only when the passage is full, and a visual indicator mounted adjacent said lower sight glass surface, whereby said indicator will be visible from the upper sight glass surface when the passage is full, but will be distorted when the passage is not full.

3. In a liquid indicator, a body of substantially inverted T-shape having a horizontal main passage and an upwardly extending sight glass portion, a sight glass mounted in said upwardly extending body portion and having a substantially horizontal upper surface and an inclined lower surface portion, said lower surface portion being disposed in the upper portion of said main passage, and an indicator mounted in said passage immediately below said inclined sight glass surface portion.

4. In a liquid indicator, a body having a horizontally extending main portion and an upwardly extending sight glass portion, an indicator clip of substantially inverted U-shaped mounted in said main passage immediately below said sight glass body portion, a sight glass having an inclined flat lower surface immediately above the main portion of said indicator clip, whereby liquid in said passage will be in contact with said inclined surface portion only when the passage is full, and means for sealing said sight glass in said upwardly extending sight glass portion.

5. In a liquid indicator, a body having a main passage and a sight glass enclosing portion extending above said main passage, a sight glass sealed in said upwardly extending body portion, said sight glass having a circular main portion and a downwardly extending portion, the lower surface of said downwardly extending portion having a notch of inverted V-shape, the surfaces of said notch being flat and adapted to be completely contacted by liquid in said main passage only when the main passage is full, and a visual indicator mounted immediately below said notched sight glass portion.

6. The combination according to claim 5, and visual indicator comprising a clip having a main portion below said notched sight glass portion, a pair of upwardly extending legs, and means for securing said legs to said body below the main sight glass portion.

7. The combination according to claim 5, said visual indicator comprising a clip carried by said body and having a legend, whereby said legend will be legible only when liquid in said passage completely contacts said notch surfaces.

8. The combination according to claim 5, said visual indicator comprising a chemical substance color responsive to changes in amounts of moisture in a refrigerant, said substance being in an area of predetermined shape, whereby the shape of said area will be discernible only when the liquid in said passage is in complete contact with the notch surfaces.

9. In a liquid indicator, a body having a substantially horizontal main passage and a sight glass portion extending thereabove, a sight glass in said sight glass body portion having upper and lower relatively inclined surfaces, the lower sight glass surface being in the upper portion of said passage whereby liquid in the passage will be in complete contact with said lower surface only when the passage is filled, and an indicator comprising a chemical substance color-responsive to the amount of moisture in a refrigerant, said chemical substance occupying an area of predetermined shape, whereby said shape will be discernible through said sight glass only when said passage is completely filled.

References Cited in the file of this patent
UNITED STATES PATENTS

| | | |
|---|---|---|
| 2,686,428 | Erikson | Aug. 17, 1954 |
| 2,811,128 | Franck | Oct. 29, 1957 |
| 2,844,026 | Wischmeyer | July 22, 1958 |